March 2, 1965   F. A. SOLSKI ETAL   3,171,916
SWITCH OPERATING MEANS ON A WORK PERFORMING PISTON
Filed Oct. 13, 1960
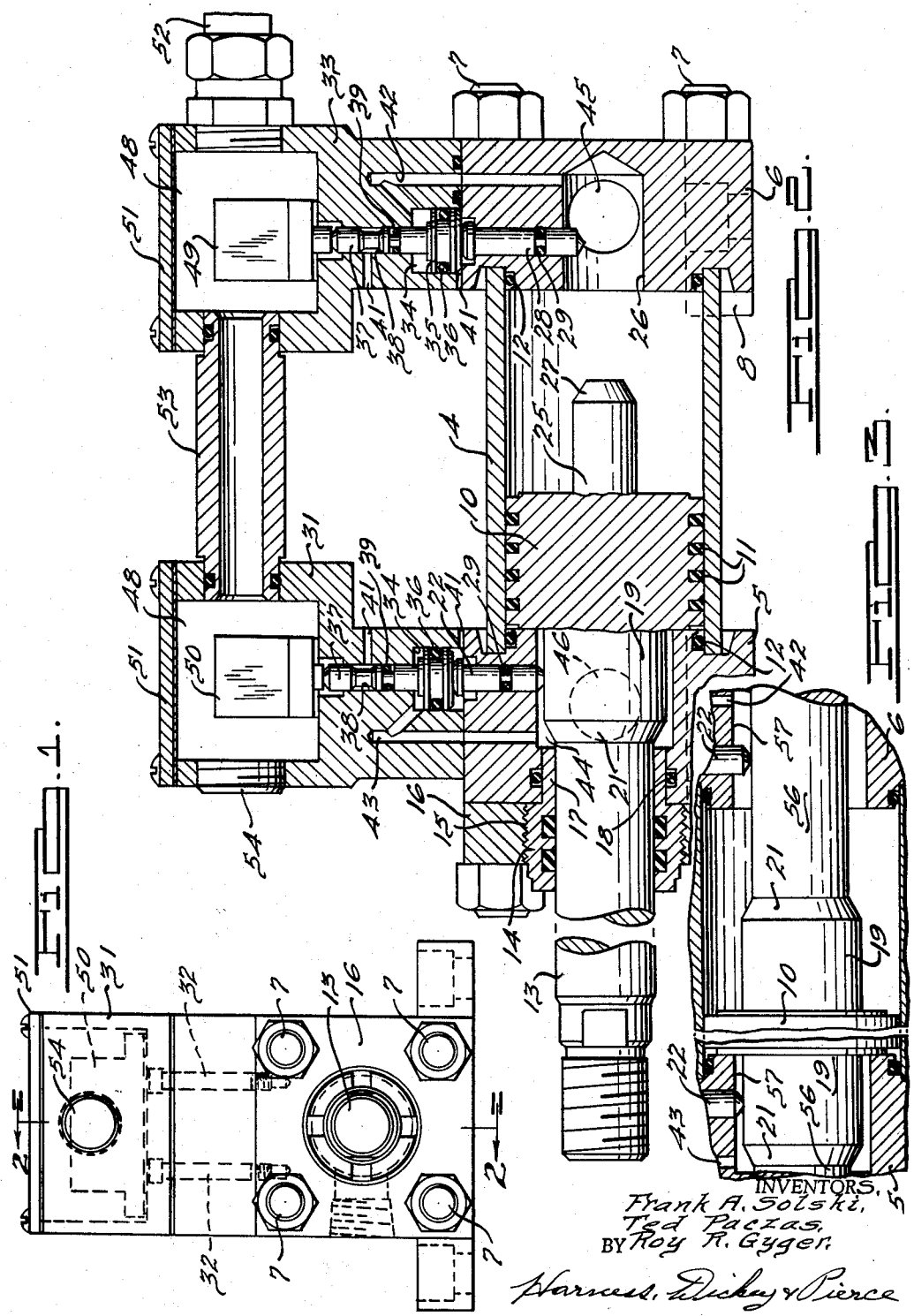
INVENTORS.
Frank A. Solski,
Ted Paczas,
BY Roy R. Gyger.
Harness, Dickey & Pierce
ATTORNEYS.

United States Patent Office 3,171,916
Patented Mar. 2, 1965

3,171,916
SWITCH OPERATING MEANS ON A WORK
PERFORMING PISTON
Frank A. Solski, 8442 Hazelton, Dearborn, Mich.; Ted
Paczas, 1925 Forest Lane, Birmingham, Mich.; and
Roy R. Gyger, 14098 Dale, Detroit, Mich.
Filed Oct. 13, 1960, Ser. No. 62,435
6 Claims. (Cl. 200—82)

This invention relates to cylinders and associated control means, and particularly to a cylinder having limit switches so located as to be actuated near the end of the movement of the piston thereof in each direction.

The invention embodies a cylinder provided with a piston which actuates a piston rod in reciprocation. Cam surfaces are provided beyond the ends of the piston for engaging a plunger near the end of each stroke of the piston for operating a limit switch and providing a signal of the approach of the piston to one or the other end of its stroke. A piston on each of the plungers is sealed within a recess to which fluid such as gas or liquid is conducted to provide pressure for retracting the plunger to its initial position when the piston within the cylinder is moved in the opposite direction.

Accordingly, the main objects of the invention are: to provide signal means actuated at opposite ends of the travel of a piston within a cylinder to indicate the position of the piston; to provide cam surfaces at the ends of a piston within a cylinder for actuating a plunger and operating a switch near each end of travel of the piston in either direction; to provide auxiliary pistons interconnected in the fluid system of a cylinder for retracting the plunger of a switch after the piston of the cylinder has been retracted, and, in general, to provide a cylinder with piston position indicating means which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a view in elevation of a cylinder and control means actuated thereby, embodying features of the present invention, FIG. 2 is an enlarged sectional view of the structure illustrated in FIG. 1, taken on the line 2—2 thereof, and FIG. 3 is a broken view of structure, similar to that illustrated in FIG. 2, showing another form of the invention.

A cylinder 4 is sealed to end blocks 5 and 6 by O-rings 12 when secured thereto by four through bolts 7. Attaching flanges 8 are provided on the end block 6 and, when desired, on the end block 5 for securing the cylinder in position. A piston 10 is located within the cylinder 4 sealed to the inner wall thereof by suitable sealing rings 11. The forward, or left-hand, end of the piston 10, as illustrated in FIG. 2, carries a piston rod 13 which reciprocates therewith. A sealing sleeve 14, engaging the surface of the piston rod 13, is secured in a threaded aperture 15 in a plate 16 secured in extension of the end block 5 by the through bolts 7. A flanged end 17 on the sleeve 14 is sealed to the end block 5 by an O-ring 18.

The piston rod 13 has an enlarged portion 19 adjacent to the piston 10 which forms a truncated conical surface 21 which functions as a cam for moving a plunger 22 outwardly of the end block 5 as the piston 10 approaches the end of its stroke when moving to the left. A cylindrical boss 25 projects from the right-hand end of the piston 10 aligned with an aperture 26 within the end block 6. The end of the projecting boss 25 has a truncated conical camming surface 27 which engages a plunger 28 and moves it outwardly near the end of the stroke of the piston when moving toward the right, as viewed in FIG. 2. The plungers 22 and 28 are sealed within the aperture in the end blocks 5 and 6 by O-rings 29. A block 31 is secured to the end block 5 by screws 32 and an end block 33 is secured to the end block 6 by the screws 32. Each of the blocks 31 and 33 contains a cylindrical aperture 34 and a piston 35 which is sealed to the wall of the aperture by O-rings 36. The pistons 35 have plungers 37 thereon which are sealed by O-rings 39 to apertures 38 in which the plungers reciprocate. Relief apertures 41 are provided in the blocks 31 and 33 for the escape of any fluid which may collect therein. A passageway 42 extends from the vertical aperture 34 into the aperture 26 of the block 6 of the cylinder and a passageway 43 extends from the cylindrical aperture 34 in the block 31 to an aperture 44 in the end block 5 of the cylinder.

Fluid is taken into and out of the cylinder through the passageway 45 in the block 6 and the passageway 46 in the block 5. When the fluid is directed into the cylinder or to the port 45, the piston 10 will move to the left, as viewed in the figure, moving the plunger 25 out of the aperture 26 and permitting the introduced fluid to pass through the passageway 42 above the piston 35 of the plate 33 and thereby moving the piston and the plunger 28 downwardly. As the piston 10 continues to advance to the left, the cam surface 21 will engage the plunger 22 in the block 5 and cause it to move outwardly, thereby displacing the piston 35 of the block 31 upwardly to move the plunger 37 upwardly therewith.

Upon the reverse movement of the piston 10, that is to say, when the piston is moved to the right, as viewed in the figure, by the introduction of fluid to the passageway 46, the enlarged portion 19 of the piston rod 13 will pass from the plunger 22 which will then be moved downwardly into the aperture 44 by the fluid in the passageway 43 which is directed to the top side of the piston 35. This retracts the plunger 37 in the block 31 while the plunger 37 in the block 33 will be moved outwardly as the projecting boss 25 of the piston 10 is moved within the aperture 26 to move the plunger 28 outwardly. When the piston 10 moves to the right, the plunger 37 in the block 33 moves outwardly while the plunger 37 of the block 31 moves inwardly, and when the piston 10 moves to the left the plunger 37 in the block 33 moves inwardly while the plunger 37 in the block 31 moves outwardly. The blocks 31 and 33 have recesses 48 in which plunger operated switches 49 and 50 are mounted and secured in sealed position by covers 51. Electric conduits (not herein illustrated) extend within the recesses 48 to the switches 49 and 50 through conduits 52 and 53 in a conventional manner. A plug 54 seals the opening at the left-hand end of the recess in the block 31 when no conduit 52 is attached thereto. When the piston 10 is moved to the right, the plunger of the switch 49 is moved inwardly and the plunger of the switch 50 is moved outwardly. When the piston 10 moves to the left, the plunger of the switch 49 moves outwardly while the plunger of the switch 50 moves inwardly. Thus it will be seen that switches are operated in sequence upon the movement of the piston 10, the plunger of one switch being released prior to the movement of the other plunger to actuate the other switch. This sequence in the opening and closing movements of the switches is timed by the location of the cam surfaces on the opposite sides of the piston 10.

In FIG. 3 the piston 10 is shown as having enlarged portions 19 extending from both sides thereof with like truncated conical surfaces 21 at opposite ends. Piston rods 56 of the same diameter extend from opposite ends of the enlarged portions 19 through apertures 57 in the cylinder end blocks 5 and 6. In this arrangement the diameter of the portions 19, the rods 56 and the apertures 57 are the same and provide like construction at both ends of the cylinder.

What is claimed is:

1. In a cylinder, a piston, cam means at the opposite ends of the piston, said piston and cam means being sealed within said cylinder, switch means actuated by said cam means extending into the cylinder in the path of movement thereof, one of the cam means operating one of the switch means in one direction after the other cam means releases the other switch means, the operation of each switch means occurring after the other switch means has been released, and fluid under pressure for operating said piston and returning said switch means when released by said cam means.

2. In a cylinder having a piston, a piston rod on one end of the piston, cam means on said piston rod, a boss on the opposite end of the piston having cam means on the end thereof, plungers extending into the path of said cam means in sealed relation to said cylinder, switches actuated by said plungers, and fluid under pressure for operating said piston and for returning said plunger when released by said cam means.

3. In a cylinder having a piston, a piston rod on one end of the piston, cam means on said piston rod, a boss on the opposite end of the piston having cam means on the end thereof, plungers extending into the path of said cam means in sealed relation to said cylinder, switches actuated by said plungers, one of said cam means releasing one of the plungers and its associated switch before the other cam means actuates its associated plunger and switch, and fluid under pressure for operating said piston and for returning said plunger when released by said cam means.

4. In a cylinder having a piston, a piston rod on one end of the piston, cam means on said piston rod, a boss on the opposite end of the piston having cam means on the end thereof, plungers extending into the path of said cam means in sealed relation to said cylinder, switches actuated by said plungers, one of said cam means releasing one of the plungers and its associated switch before the other cam means actuates its associated plunger and switch, and pistons for moving said plungers into the path of said cam means, said cylinder having passageways for conducting fluid under pressure to said plunger pistons which are returned thereby when released by said cam means.

5. The combination with a cylinder having a piston and end blocks, plates secured to said end blocks having passageways from the cylinder to a recess, a piston in each said recess, switch means in said plates adjacent to said recesses, plungers in said recess moved by said recess pistons when fluid is applied thereto, and cam means at the opposite ends of the cylinder piston for engaging and moving said plungers which is disposed in the path of movement thereof for moving said recess pistons outwardly to actuate the associated switch when the cylinder piston is moved in one or the other direction by the fluid under pressure which pressure fluid also moves the recess pistons for returning the plungers when released by the associated cam surface, the reverse pressure fluid flow moving the cylinder piston in the opposite direction causing the retraction of the recess piston in the end plate from which the cylinder piston moves to release the switch means after which the plunger is engaged by the cam surface on the opposite side of the piston for actuating the switch adjacent thereto.

6. In a cylinder, a piston, cam means at the opposite ends of the piston, switch means actuated by said cam means, one of the cam means operating one of the switch means outwardly of the cylinder, means operating the other switch means inwardly of the cylinder, said cam means at opposite ends of its piston having the same diameter, and fluid under pressure for operating said piston and returning said switch means when released by said cam means.

References Cited in the file of this patent

UNITED STATES PATENTS

| | | |
|---|---|---|
| 2,469,120 | Kropp | May 3, 1949 |
| 2,535,940 | Malvin | Dec. 26, 1950 |
| 2,658,123 | Van Stoeser | Nov. 19, 1953 |
| 2,691,962 | Johnson | Oct. 19, 1954 |
| 2,753,414 | Stevenson | July 3, 1956 |
| 3,026,387 | Ashbaugh | Mar. 20, 1962 |